United States Patent
Klaphake

(10) Patent No.: US 10,591,075 B2
(45) Date of Patent: Mar. 17, 2020

(54) SHOCK ABSORBING AND WEAR RESISTANT BALL CHECK SEAT FOR ABRASIVE MEDIA

(71) Applicant: Graco Minnesota Inc., Minneapolis, MN (US)

(72) Inventor: Andrew J. Klaphake, Minneapolis, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 173 days.

(21) Appl. No.: 15/384,929

(22) Filed: Dec. 20, 2016

(65) Prior Publication Data

US 2017/0175913 A1 Jun. 22, 2017

Related U.S. Application Data

(60) Provisional application No. 62/270,182, filed on Dec. 21, 2015.

(51) Int. Cl.

| | | |
|---|---|---|
| *F16K 25/00* | (2006.01) | |
| *F04B 49/22* | (2006.01) | |
| *F16K 15/04* | (2006.01) | |
| *F16K 25/04* | (2006.01) | |

(52) U.S. Cl.
CPC ............ *F16K 25/005* (2013.01); *F04B 49/22* (2013.01); *F16K 15/04* (2013.01); *F16K 25/04* (2013.01); *F16C 2208/78* (2013.01)

(58) Field of Classification Search
CPC ...... F16K 25/005; F16K 15/04; F16K 15/148; F16K 25/04; F04B 49/22
See application file for complete search history.

(56) References Cited

U.S. PATENT DOCUMENTS

| | | | |
|---|---|---|---|
| 4,646,969 | A | 3/1987 | Sorm et al. |
| 4,766,927 | A | 8/1988 | Conatser |
| 5,433,710 | A | 7/1995 | VanAntwerp et al. |
| 5,482,077 | A | 1/1996 | Serafin |
| 5,667,144 | A | 9/1997 | Snetting |
| 6,299,413 | B1 | 10/2001 | Stahlman et al. |
| 6,558,141 | B2 | 5/2003 | Vonalt et al. |
| 6,863,475 | B2 | 3/2005 | DeVaull, III et al. |

(Continued)

FOREIGN PATENT DOCUMENTS

| | | |
|---|---|---|
| CN | 1179737 A | 4/1998 |
| CN | 1335205 A | 2/2002 |

(Continued)

OTHER PUBLICATIONS

Braskem, UTEC data sheet, Aug. 2012, Braskem, pp. 1-2; http://www.braskem.com.br/Portal/Braskem/files/UTEC3040%20TDS.pdf (Year: 2012).*

(Continued)

*Primary Examiner* — P. Macade Nichols
(74) *Attorney, Agent, or Firm* — Kinney & Lange, P.A.

(57) ABSTRACT

A check valve includes a ball and a seat. The seat includes a body and a hole extending through the body. The hole is smaller in diameter than the ball. The body of the seat is formed from ultra-high-molecular-weight polyethylene. The ultra-high-molecular-weight polyethylene of the seat has an ASTM D648 heat deflection temperature of 46.7° C. at 1.8 MPa.

6 Claims, 3 Drawing Sheets

(56) References Cited

U.S. PATENT DOCUMENTS

| | | |
|---|---|---|
| 6,988,708 B2 | 1/2006 | Caprera |
| 7,311,118 B2 | 12/2007 | Doutt |
| 7,444,923 B2 | 11/2008 | Horning et al. |
| 7,648,496 B2 | 1/2010 | Gillis et al. |
| 8,714,521 B2 | 6/2014 | Nelson et al. |
| 2004/0048958 A1 | 3/2004 | Didier |
| 2005/0217730 A1* | 10/2005 | Doutt .................... F16K 15/044 137/539.5 |
| 2006/0188380 A1 | 8/2006 | Strong |
| 2012/0319027 A1 | 12/2012 | Dobbs et al. |

FOREIGN PATENT DOCUMENTS

| | | |
|---|---|---|
| CN | 2674233 Y | 1/2005 |
| CN | 1255219 C | 5/2006 |
| JP | 3235100 B2 | 12/2001 |
| KR | 10-1998-0065294 A | 10/1998 |
| WO | 2011066442 A2 | 6/2011 |

OTHER PUBLICATIONS

Quadrant EPP TIVAR ® H.O.T. UHMW-PE, Premium Heat Stabilized/Anti-Oxidant Filled, (FDA, USDA, & 3-A Dairy) (ASTM Product Data Sheet) Quadrant Engineering Plastic Products. http://qepp.matweb.com/search/DataSheet.aspx?Bassnum=P1SMP13&ckck=1. Two pages.
TIVAR ® H.O.T. (Higher Operating Temperature), Quadrant Engineering Plastic Products. http://media.quadrantplastics.com/fileadmin/quadrant/documents/QEPP/EU/Product_Data_Sheets_PDF/PE/TIVAR_H.O.T._PDS_E_31052011.pdf. Jan. 25, 2011, One page.
International Search Report and Written Opinion of Application No. PCT/US2016/067748 dated Apr. 11, 2017, 12 pages.
First Chinese Office Action dated Feb. 25, 2019, received for corresponding Chinese Application No. 201680075307.5, 9 pages.
European Search Report dated Jun. 28, 2019, received for corresponding European Application No. 16879962.5.

* cited by examiner

SHOCK ABSORBING AND WEAR RESISTANT BALL CHECK SEAT FOR ABRASIVE MEDIA

BACKGROUND

Many automotive paints include flat flakes comprising metal and/or metal oxide as a paint pigment. These pigment flakes not only provide attractive visible properties to the automotive paint but also include the ability to reflect a high proportion of solar energy from the paint and the vehicle covered in the paint. At automotive plants where the paint is applied to automobile bodies, reciprocating pumps continuously circulate the paint to keep the pigment flakes and other ingredients in the paint from settling. Reciprocating pumps generally include several check valves. These check valves include a ball and a seat. In the past, both the ball and the seat were formed from stainless steel. While steel balls and steel seats in the check valves have proved satisfactory in many painting application environments, steel seats lack durability when the reciprocating pumps circulate paint containing these pigment flakes. These pigment flakes erode the stainless steel seats in the check valve as the paint circulates through the reciprocating pump, ultimately leading to failure of the check valves. This erosion problem has been addressed in the past by replacing the stainless steel seats with seats formed from tungsten carbide. The tungsten carbide seats are harder than the stainless steel seats and do resist erosion from the pigment flakes better than the stainless steel seats, however, the tungsten carbide seats are considerably more expensive than the stainless steel seats. Furthermore, the steel check ball can deform and lodge against the much harder tungsten carbide seat, resulting in failure of the check valve. Rubber O-rings have been combined with tungsten carbide and stainless steel seats to provide a softer contact between the ball and the seat. However, automotive paints can include a considerable amount of solvent which can prematurely degrade rubber O-rings.

SUMMARY

In one aspect of the disclosure, a fluid circulating system for maintaining flakes in suspension within a liquid includes a pump configured to circulate the liquid and the flakes. At least one check valve is positioned fluidically between an inlet and an outlet of the pump. The check valve includes a ball and a seat. The seat includes a body and a hole extending through the body. The hole is smaller in diameter than the ball. The body of the seat is formed from ultra-high-molecular-weight polyethylene.

In another aspect of the disclosure, a check valve includes a ball and a seat. The seat includes a body and a hole extending through the body. The hole is smaller in diameter than the ball. The body of the seat is formed from ultra-high-molecular-weight polyethylene. The ultra-high-molecular-weight polyethylene of the seat has an ASTM D648 heat deflection temperature of 46.7° C. at 1.8 MPa.

In another aspect of the disclosure, a check valve for use with a reciprocating pump includes a housing with a valve chamber formed in the housing. A ball is disposed inside the valve chamber. A ball seat is disposed inside the valve chamber. The ball seat includes a body and a hole extending through the body. The hole is smaller in diameter than the ball. The body of the ball seat is formed from ultra-high-molecular-weight polyethylene. The ultra-high-molecular-weight polyethylene of the seat has an ASTM D648 heat deflection temperature of 46.7° C. at 1.8 MPa.

Persons of ordinary skill in the art will recognize that other aspects and embodiments of the present invention are possible in view of the entirety of the present disclosure, including the accompanying figures.

DETAILED DESCRIPTION

The disclosure relates to check valve seats in reciprocating pumps that circulate paint or other fluids containing relatively hard pigment flakes. The proposed reciprocating pump includes at least one check valve with a seat formed from ultra-high-molecular-weight polyethylene for paint applications that use pigment flakes comprising metal and/or metal oxide. The seat can also be formed from high-temperature ultra-high-molecular-weight polyethylene having an ASTM D648 heat deflection temperature of 46.7° C. at 1.8 MPa. Check valve seats formed from ultra-high-molecular-weight polyethylene resist erosion from paints containing pigment flakes. Check valve seats formed from ultra-high-molecular-weight polyethylene are also chemically immune to the solvents in the paint. Check valve seats formed from ultra-high-molecular-weight polyethylene are also more cost effective than steel seats and tungsten carbide seats.

Figure 1:
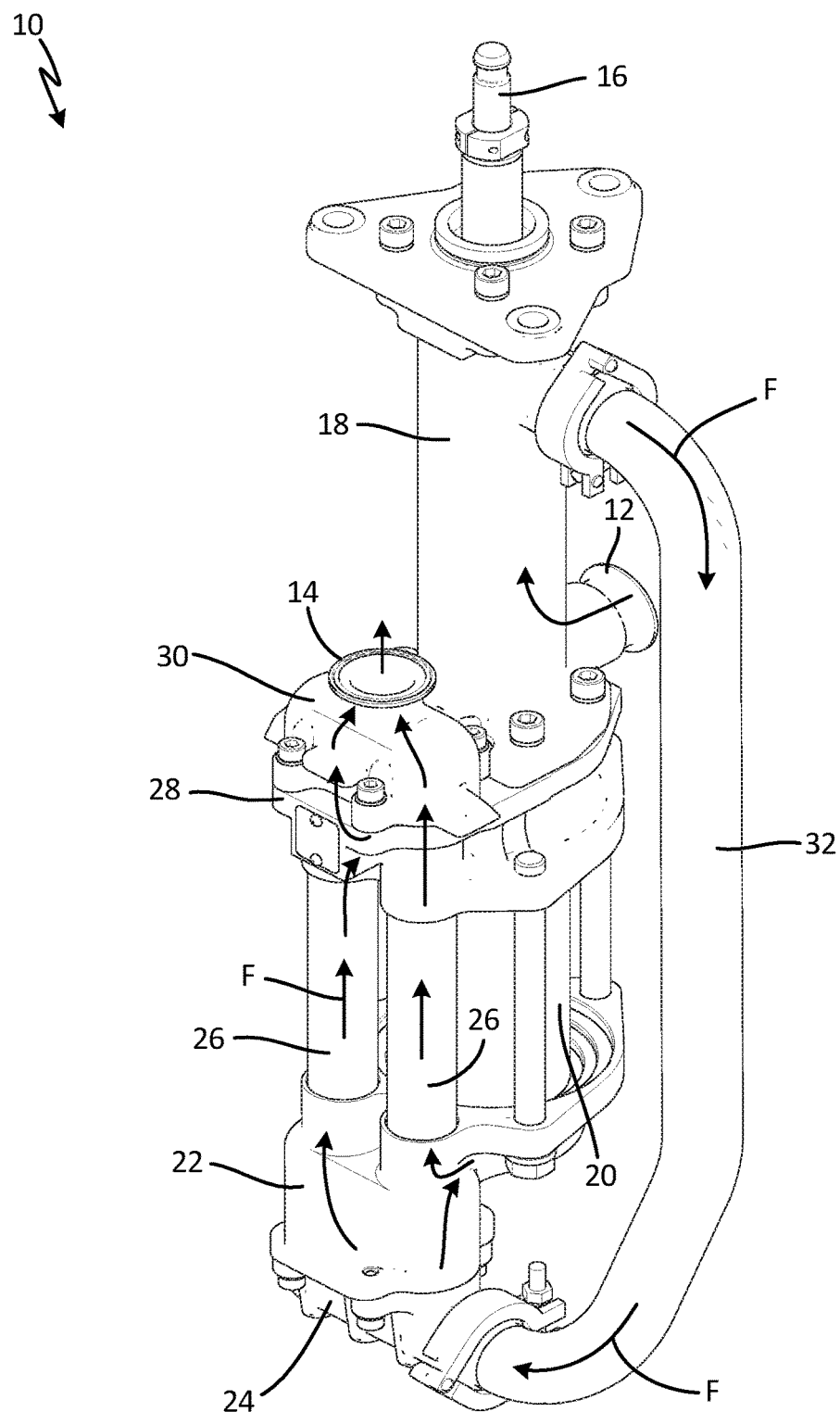
FIG. 1 is a perspective view of a reciprocating pump.

FIG. 1 is a perspective view of reciprocating pump 10, which can be used to circulate fluid F in a fluid circulating system. In one example, reciprocating pump 10 and the fluid circulating system can be used in an automotive paint kitchen and fluid F can be automotive paint containing pigment flakes (not shown) comprising metal and/or metal oxide. For example, the pigment flakes in fluid F can be mica flakes coated in titanium dioxide. In another example, the pigment flakes in fluid F can be aluminum oxide flakes coated in titanium dioxide. Reciprocating pump 10 continuously moves and circulates fluid F to keep the pigment flakes suspended in fluid F. While paint is one example of fluid F, it should be understood that paint is merely one example and that other fluids (such as water, oil, solvents, etc.) can be displaced by reciprocating pump 10. As shown in FIG. 1, reciprocating pump 10 includes pump inlet 12, pump outlet 14, piston rod 16, bellows chamber 18, piston housing 20, inlet housing 22, inlet manifold 24, tubes 26, outlet housing 28, outlet manifold 30, and side manifold 32.

Piston housing 20 is connected between outlet housing 28 and inlet housing 22. Tubes 26 are also connected between outlet housing 28 and inlet housing 22. Inlet housing 22 fluidically connects piston housing 20 with tubes 26. Inlet manifold 24 is connected to inlet housing 22 opposite tubes 26. Inlet manifold 24 and inlet housing 22 together house two check valves (not shown) such that each check valve is in line and fluidic communication with one of tubes 26. Outlet manifold 30 is connected to outlet housing 28 opposite tubes 26. Outlet manifold 30 and outlet housing 28 together house two check valves (shown and discussed in FIG. 2) such that each check valve is in line and fluidic communication with one of tubes 26. Outlet manifold 30 also forms pump outlet 14.

Bellows chamber 18 and pump inlet 12 are connected to outlet housing 28 opposite piston housing 20. Piston rod 16 extends through bellows chamber 18 and outlet housing 28 to connect with a piston (not shown) disposed inside piston housing 20. Bellows (not shown) are disposed inside bellows chamber 18 and around piston rod 16 to seal the interior of reciprocating pump 10 from ambient air. Side manifold 32 is connected to bellows chamber 18 and inlet manifold 24.

During operation of reciprocating pump 10, fluid F is disposed inside pump inlet 12, bellows chamber 18, side manifold 32, inlet manifold 24, inlet housing 22, piston housing 20, tubes 26, outlet housing 28, outlet manifold 30, and pump outlet 14. Piston rod 16 is driven axially in a reciprocating manner up and down. As piston rod 16 is actuated axially upward, piston rod 16 pulls the piston inside piston housing 20 upward, causing fluid F to flow through pump inlet 12, through bellows chamber 18, through side manifold 32, into inlet manifold 24, through one of the check valves in the inlet housing 22, and into piston housing 20 below the piston. Simultaneously, while the piston is pulled upward, the piston pushes fluid F disposed above the piston out of piston housing 20, into outlet housing 28, through one of the check valves in outlet manifold 30, and through pump outlet 14.

When piston rod 16 is actuated axially downward, the piston inside piston housing 20 pushes fluid F disposed below the piston out of piston housing 20, through inlet housing 22, into one of tubes 26, through outlet housing 28, through one of the check valves in outlet manifold 20, and through pump outlet 14. Simultaneously, while the piston is pushed downward, fluid F is pulled through pump inlet 12, through bellows chamber 18, through side manifold 32, into inlet manifold 24, through one of the check valves in the inlet housing 22, through one of tubes 26, into outlet housing 28, and into piston housing 20 above the piston. The cycle of piston rod 16 and the piston inside piston housing 20 is then repeated to keep fluid F moving steadily into pump inlet 12 and out pump outlet 14. The integrity of the two check valves inside inlet housing 22 and the two check valves inside outlet manifold 30 are required to move fluid F from pump inlet 12 to pump outlet 14. The check valves of reciprocating pump 10 are discussed in below with reference to FIG. 2.

Figure 2:
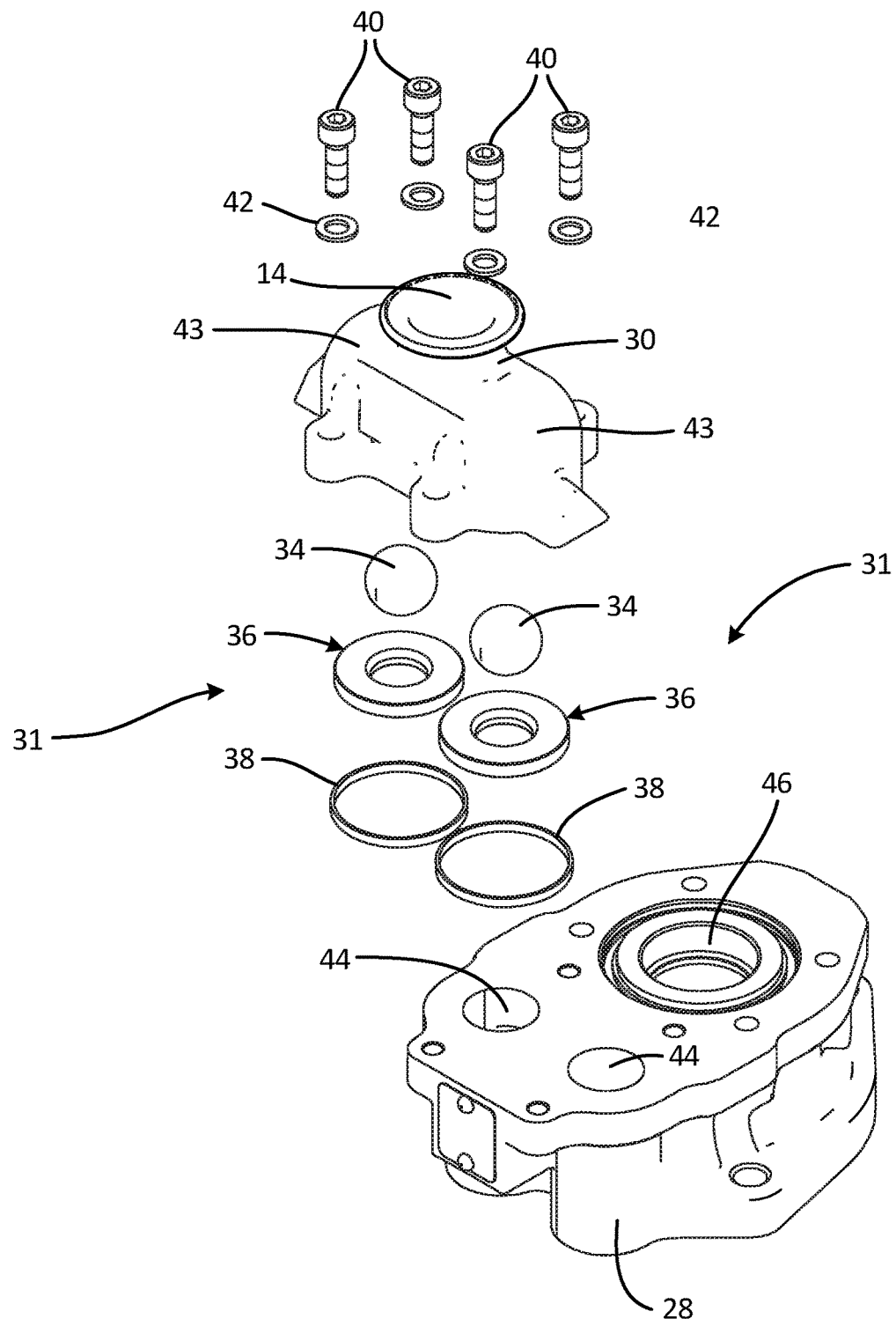
FIG. 2 is an exploded view of an outlet housing and an outlet manifold of the reciprocating pump and two check valves disposed inside the outlet housing and the outlet manifold.

FIG. 2 is an exploded view of outlet housing 28, outlet manifold 30, and check valves 31 of reciprocating pump 10 (shown in FIG. 1). As shown in FIG. 2, each of check valves 31 includes ball 34, ball seat 36, and gasket 38. Reciprocating pump 10 further includes fasteners 40 and washers 42 to connect outlet manifold 30 to outlet housing 28. Outlet manifold 30 includes two check valve chambers 43. Outlet housing 28 includes two fluid openings 44 for communicating fluid F to check valves 31. Outlet housing 28 also includes rod hole 46 for accommodating piston rod 16 (shown in FIG. 1).

Each of check valve chambers 43 is formed in outlet manifold 30 and is sized to house ball 34 and at least a portion of ball seat 36 of check valve 31. When outlet manifold 30 is connected to outlet housing 28 by fasteners 40, each of ball seat 36 is positioned over one of fluid openings 44 of outlet housing 28. Gaskets 38 are each disposed around one of ball seats 36 and between outlet housing 28 and outlet manifold 30. Gaskets 38 seal check valves 31 and prevent fluid F from leaking out between outlet housing 28 and outlet manifold 30. During operation of reciprocating pump 10, check valves 31 operate in the same manner as conventional check valves. As reciprocating pump 10 pushes fluid F through fluid openings 44 of outlet housing 28, fluid F flows through ball seats 36 and lifts balls 34 away from ball seats 36. Fluid F then flows around balls 34 and flows toward pump outlet 14. Between cycles of reciprocating pump 10, balls 34 fall back onto ball seats 36 to keep fluid F from re-entering fluid openings 44 of outlet housing 28. As fluid F flows through check valves 31, the pigment flakes in fluid F can impact against ball seats 36. As discussed below with reference to FIG. 3, the composition and size of each ball seat 36 is selected to reduce abrasion and wear between ball seats 36 and the pigment flakes in fluid F.

Figure 3:
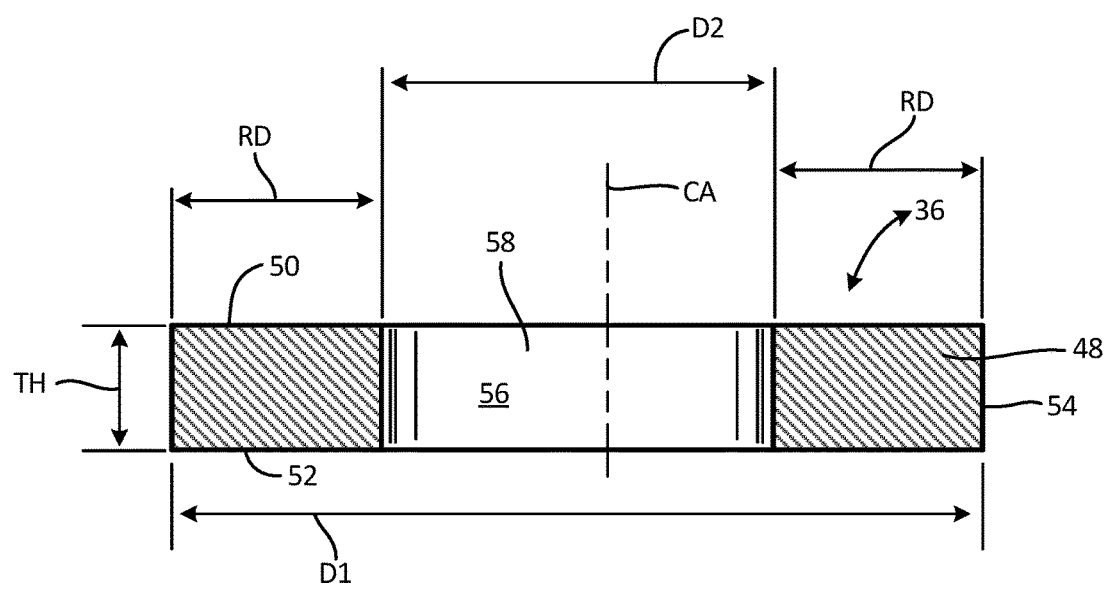
FIG. 3 is a cross-sectional view of a seat of the check valve.

FIG. 3 is a cross-sectional view of one of ball seats 36 of check valve 31. As shown in FIG. 3, ball seat 36 includes body 48, top surface 50, bottom surface 52, outer circumferential surface 54, hole 56, inner circumferential surface 58, center axis CA, and thickness TH. Outer circumferential surface 54 includes a diameter D1. Inner circumferential surface 58 and hole 56 include a diameter D2. Top surface 50 and bottom surface 52 both share a radial dimension RD.

Body 48 of ball seat 36 shown in FIG. 3 is cylindrical with top surface 50 being disposed opposite bottom surface 52 with outer circumferential surface 54 extending axially from top surface 50 to bottom surface 52 relative center axis CA. Top surface 50 and bottom surface 52 are parallel. Hole 56 is centered on center axis CA and extends through top surface 50 and bottom surface 52 and forms inner circumferential surface 58. Inner circumferential surface 58 extends from top surface 50 to bottom surface 52 and is parallel to outer circumferential surface 54. Diameter D2 of inner circumferential surface 58 and hole 56 is smaller than a diameter of ball 34 (shown in FIG. 2) so that ball 34 is unable to pass through hole 56. A ratio (D2/D1) between Diameter D2 of inner circumferential surface 58 and Diameter D1 of outer circumferential surface D2 can be 0.481 to 0.487.

Thickness TH of ball seat 36 is the axial distance between top surface 50 and bottom surface 52. Radial dimension RD of top surface 50 and bottom surface 52 is defined as the difference between Diameter D1 of outer circumferential surface 54 and Diameter D2 of inner circumferential surface 58. To help ball seat 36 resist large deformation under the pressure of fluid F inside reciprocating pump 10, ball seat 36 can be sized such that a ratio (TH/RD) of the thickness TH to the radial dimension RD is 0.248 to 0.259.

To withstand the impact of the pigment flakes in fluid F, body 48 of ball seat 36 is made from ultra-high-molecular-weight polyethylene (hereinafter referred to as "UHMWPE"). The UHMWPE used to form body 48 of ball seat 36 can be a high temperature grade UHMWPE with an ASTM D648 heat deflection temperature of 46.7° C. at 1.8 MPa. The ASTM D648 heat deflection temperature of a material is defined by the following test: a test specimen is loaded in three-point bending in the edgewise direction with an outer fiber stress of 1.8 MPa, and the temperature is increased at 2° C./min until the specimen deflects 0.25 mm. One example of the high temperature grade UHMWPE is sold under the trade mark TIVAR® H.O.T. by Quadrant EPP USA, Inc., Pennsylvania.

Ball seat 36 made from a high temperature grade UHMWPE was tested in a reciprocating pump that circulated a paint containing metal oxide pigment flakes. The temperature of the paint in the test was between 0° C. and 48° C. During the tests, ball seat 36 proved to be more durable than conventional steel ball seats because the pigment flakes of the paint did not abrade or erode the UHMWPE material of ball seat 36. Furthermore, the UHMWPE material of ball seat 36 is much softer (HRR50 hardness on the Rockwell scale) than conventional stainless steel seats (HRB85 hardness on the Rockwell scale) and tungsten carbide seats (HRA92 hardness on the Rockwell scale). The relative softness of the UHMWPE material of ball seat 36 allowed ball seat 36 to slightly deform under pressure to the contours of ball 34 (shown in FIG. 2), thereby reducing leakage between ball seat 36 and ball 34. Reducing leakage between ball 34 and ball seat 36 also reduces high velocity leak paths that might erode ball seat 36. Because ball seat 36 was made from a grade of UHMWPE with an ASTM D648 heat deflection temperature of 46.7° C. at 1.8 MPa, ball seat 36 also did not overly deform or creep like most other grades of UHMWPE when the temperature of the paint inside the reciprocating pump was raised between 38° C. and 48° C.

In view of the foregoing description, it will be recognized that the present disclosure provides numerous advantages and benefits. For example, ball seat 36, made from a high temperature grade UHMWPE, resists erosion better than stainless steel seats when used in the circulation of fluids containing pigment flakes comprising metal or metal oxides. Reducing erosion of ball seat 36 increases the operational life of reciprocating pump 10. Furthermore, ball seat 36 is softer than both stainless steel and tungsten carbide and thus creates a tighter seal with ball 34 than would a stainless steel or tungsten carbide ball seat. By creating a tighter seal with ball 34, ball seat 36 reduces leakage between ball 34 and ball seat 36 which improves pump efficiency and reduces erosion in check valve 31. Ball seat 36 is also chemically immune to solvents in automotive paint because ball seat 36 is formed from UHMWPE. Ball seat 36 is also more affordable than conventional ball seats because UHMWPE generally costs less than stainless steel and tungsten carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A check valve comprising:
   a ball; and
   a seat comprising a body and a hole extending through the body, wherein the hole is smaller in diameter than the ball and wherein the body of the seat is formed from ultra-high-molecular-weight polyethylene,
   wherein the body of the seat is cylindrical with a top surface disposed opposite a bottom surface and an outer circumferential surface extending axially from the top surface to the bottom surface relative a center axis of the seat;
   wherein the hole extends through the top surface and the bottom surface of the body of the seat and forms an inner circumferential surface, wherein the inner circumferential surface extends from the top surface to the bottom surface and is parallel to the outer circumferential surface, and wherein a ratio between a diameter of the inner circumferential surface and a diameter of the outer circumferential surface is 0.481 to 0.487.

2. The check valve of claim 1, wherein the body of the seat is cylindrical with a top surface disposed opposite a bottom surface and an outer circumferential surface extending axially from the top surface to the bottom surface relative a center axis of the seat.

3. The check valve of claim 2, wherein the top surface and the bottom surface are parallel.

4. The check valve of claim 1, wherein the body of the seat comprises a thickness defined as the axial distance between the top surface and the bottom surface, wherein a ratio of the thickness of the seat to a difference between the diameter of the outer circumferential surface and the diameter of the inner circumferential surface is 0.248 to 0.259.

5. A check valve for use with reciprocating pump, the check valve comprising:
   a housing with a valve chamber formed in the housing;
   a ball disposed inside the valve chamber; and
   a ball seat disposed inside the valve chamber, wherein the ball seat comprises a body and a hole extending through the body, wherein the hole is smaller in diameter than the ball and wherein the body of the ball seat is formed from ultra-high-molecular-weight polyethylene, wherein the ultra-high-molecular-weight polyethylene of the seat has an ASTM D648 heat deflection temperature of 46.7° C. at 1.8 MPa and
   wherein the hole extends through the top surface and the bottom surface of the body of the ball seat and forms an inner circumferential surface, wherein the inner circumferential surface extends from the top surface to the bottom surface and is parallel to the outer circumferential surface, and wherein a ratio between a diameter of the inner circumferential surface and a diameter of the outer circumferential surface is 0.481 to 0.487, and
   wherein the body of the ball seat is cylindrical with a top surface disposed opposite a bottom surface and an outer circumferential surface extending axially from the top surface to the bottom surface relative a center axis of the seat.

6. The check valve of claim 1, wherein the ultra-high-molecular-weight polyethylene of the seat has an ASTM D648 heat deflection temperature of 46.7° C. at 1.8 MPa.

* * * * *